(12) United States Patent
Baracca et al.

(10) Patent No.: US 9,771,981 B2
(45) Date of Patent: Sep. 26, 2017

(54) SEALING DEVICE FOR A ROLLING BEARING

(71) Applicants: Fausto Baracca, Massa (IT); Daniele Martin Duch, San Gillio (IT); Fabio Falaschi, Carrara (IT)

(72) Inventors: Fausto Baracca, Massa (IT); Daniele Martin Duch, San Gillio (IT); Fabio Falaschi, Carrara (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/845,308

(22) Filed: Sep. 4, 2015

(65) Prior Publication Data

US 2016/0076596 A1    Mar. 17, 2016

(30) Foreign Application Priority Data

Sep. 12, 2014   (IT) .............................. TO2014A0717

(51) Int. Cl.
*F16C 33/80*    (2006.01)
*F16C 33/78*    (2006.01)
(Continued)

(52) U.S. Cl.
CPC ...... *F16C 33/7896* (2013.01); *F16C 33/7823* (2013.01); *F16C 33/7866* (2013.01);
(Continued)

(58) Field of Classification Search
CPC .. F16C 33/762; F16C 33/782; F16C 33/7823; F16C 33/7826; F16C 33/784;
(Continued)

(56) References Cited

U.S. PATENT DOCUMENTS 4,792,242 A * 12/1988 Colanzi ............... F16C 33/7859
                                                        384/478
4,792,243 A * 12/1988 Takeuchi ............ F16C 33/6618
                                                        277/402
(Continued)

FOREIGN PATENT DOCUMENTS

| DE | 102009033350 A1 | 1/2011 |
| EP | 2287483 A1 | 2/2011 |
| JP | 2000018260 A | 1/2000 |
| JP | 2003004123 A | 1/2003 |
| JP | 2006266451 A | 10/2006 |
| JP | 2006312970 A | 11/2006 |
| JP | 2007255637 A | 10/2007 |

(Continued)

*Primary Examiner* — James Pilkington
(74) *Attorney, Agent, or Firm* — Bryan Peckjian; SKF USA Inc. Patent Dept.

(57) ABSTRACT

A sealing device including a first annular shield fixable to a first ring, a second annular shield facing the first and fixable to a second ring. A first shield annular sliding sealing lip cooperating with the second ring. At least first and second annular non-contacting sealing lips of the second shield. The first non-contacting lip includes a first portion extending in projection, and a second end extending axially and radially projecting from the first portion; being tapered towards a free end thereof, axially away from the first ring, which come into contact axially when the first annular lip is bent towards the first shield. The second non-contacting lip extends axially projecting from the first shield from the same side as the second portion of the first lip and beyond it and forms towards the first lip an annular collecting channel of possible contaminants which pass beyond the first annular lip.

10 Claims, 2 Drawing Sheets

(51) Int. Cl.
*F16J 15/324* (2016.01)
*F16J 15/3264* (2016.01)

(52) U.S. Cl.
CPC ............. *F16C 33/80* (2013.01); *F16J 15/324* (2013.01); *F16J 15/3264* (2013.01); *F16C 2326/58* (2013.01)

(58) Field of Classification Search
CPC ............. F16C 33/7859; F16C 33/7863; F16C 33/7866; F16C 33/7896; F16C 33/80; F16C 33/805; F16J 15/3232; F16J 15/324; F16J 15/3264
USPC .................................................. 277/347, 411
See application file for complete search history.

(56) References Cited

U.S. PATENT DOCUMENTS

| | | | | |
|---|---|---|---|---|
| 6,042,272 | A * | 3/2000 | Nagase | F16C 33/7859 384/486 |
| 8,628,248 | B2 * | 1/2014 | Walter | F16J 15/3264 384/477 |
| 9,157,475 | B2 * | 10/2015 | Gutowski | F16C 33/7896 |
| 2012/0207417 | A1 * | 8/2012 | Walter | F16C 33/7883 384/477 |

FOREIGN PATENT DOCUMENTS

| | | |
|---|---|---|
| JP | 2009204012 A | 9/2009 |
| JP | 2012184814 A | 9/2012 |

* cited by examiner

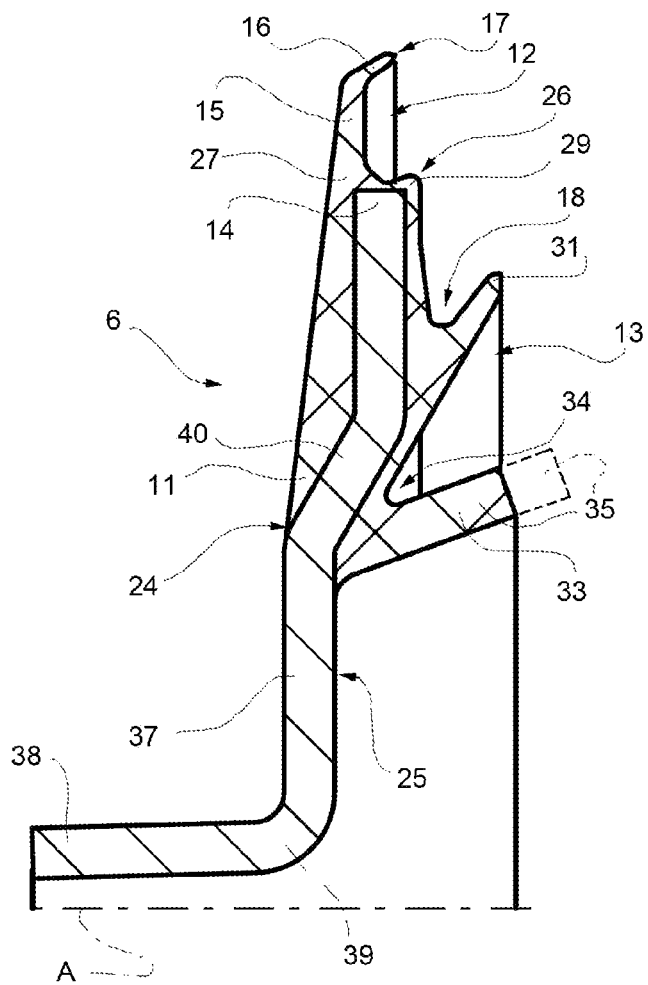
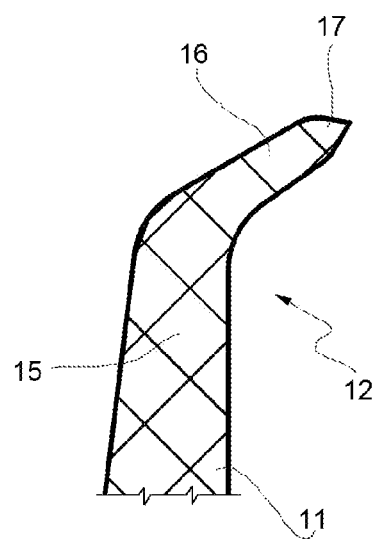
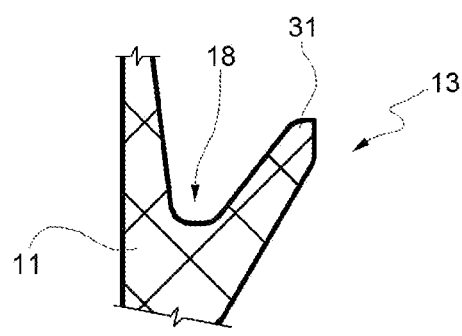
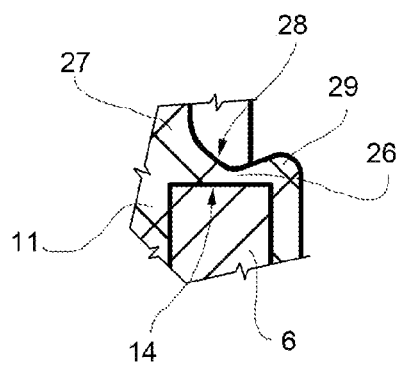

SEALING DEVICE FOR A ROLLING BEARING

CROSS REFERENCE TO RELATED APPLICATIONS

This is a Non-Provisional Patent Application, filed under the Paris Convention, claiming the benefit of Italy (IT) Patent Application Number TO2014A000717, filed on 12 Sep. 2014 (12.09.2014), which is incorporated herein by reference in its entirety.

TECHNICAL FIELD OF THE PRESENT INVENTION

The present invention relates to a sealing device for a rolling bearing intended to equip machines which come frequently into contact with liquid detergents, e.g. intended to equip systems and machines used in the food processing industry, e.g. conveyors, which for hygienic reasons are subjected to daily washes with pressurized jets of liquid detergents.

PRIOR ART

As known, the rolling bearings intended to equip machinery for the food processing industry are subjected to very frequent washes, usually a daily wash in addition to a high intensity weekly wash, carried out using pressurized jets of detergent/disinfectant liquid.

Probably because of these frequent washes with detergents having low surface tension, an early wear of the sealing lips, and subsequently of the rolling bearing, is found. Making seals with high interference contacting lips does not appear to greatly improve the sealing action, while it does instead considerably increase friction, with consequent higher energy consumptions and, above all, increases causing a greater wear of the contacting lips. DE102009033350 does not solve these problems.

SUMMARY OF THE INVENTION

It is the object of the present invention to provide a sealing device of a rolling bearing, in particular intended to equip machine for the food processing industry, which solves the problem of the early wear of these bearings without causing increases of friction.

According to the invention, a sealing device is thus provided for a rolling bearing, in particular intended to equip machinery for the food processing industry and a rolling bearing equipped with such a sealing device, the sealing device including:
- a first annular shield designed to be constrained to a first ring of the rolling bearing;
- a second annular shield arranged facing the first shield and designed to be constrained in use to a second ring of the rolling bearing;
- a first sealing gasket made of an elastomer and integrally carried by a first face of the first shield, the first gasket being provided with at least one annular sliding sealing lip intended to cooperate in contact, in use, with the second ring of the rolling bearing; and
- a second sealing gasket made of an elastomer and integrally carried by the second shield, the second gasket comprising one first and one second annular, non-contacting, sealing lips designed to cooperate, in use, with the first ring of the rolling bearing and with the second shield, respectively;

wherein, in combination:
i)—the first face of the first shield faces the side opposite to the second shield and the first annular non contacting sealing lip extends projecting from a peripheral edge of the second shield facing the side opposite to the first shield and is elastically deformable to bend, in use, towards the first shield when the second shield is struck by a jet of liquid;
ii)—the first annular non contacting lip comprises a first portion, which extends radially projecting from the peripheral edge of the second shield, and a second portion defining a peripheral annular edge of the first lip opposite to the peripheral edge of the second shield and shaped as a truncated-cone toroid which extends axially and radially projecting from the first portion and which presents a free end designed, in use, to remain axially away from the first ring of the rolling bearing and come axially into contact with the first ring of the rolling bearing when the first annular lip is bent towards the first shield;
iii)—the second portion of the first annular non contacting lip is arranged obliquely with respect to a symmetry axis of the sealing device so as to go away from the symmetry axis towards the free end thereof;
iv)—the second annular non contacting lip extends axially projecting from the second shield on the same side as the second portion of the first annular lip and beyond the second portion of the first annular lip; and
v)—the second annular non contacting lip is arranged obliquely with respect to the symmetry axis so as to extend radially projecting from the second shield towards the first annular non contacting lip to form, towards the first annular non contacting lip, a first annular collecting channel of possible contaminants which pass beyond the first annular lip.

In this manner, not only is the access of external contaminants, and in particular of liquid detergent, towards at least one contacting sealing lip of the device, prevented as much as possible but, above all, its rapid evacuation is allowed at the end of the periodical washing operations of the machinery.

BRIEF DESCRIPTION OF THE DRAWINGS

The invention will now be described with reference to the accompanying drawings which illustrate a non-limitative embodiment thereof, in which:

FIG. 2 shows the same view in radial section of a component of the sealing device shown in FIG. 1 on enlarged scale; and FIGS. 3, 4 and 5 show details of the component in FIG. 2 in radial section and on further enlarged scale.

DETAILED DESCRIPTION OF THE PRESENT INVENTION

Figure 1:
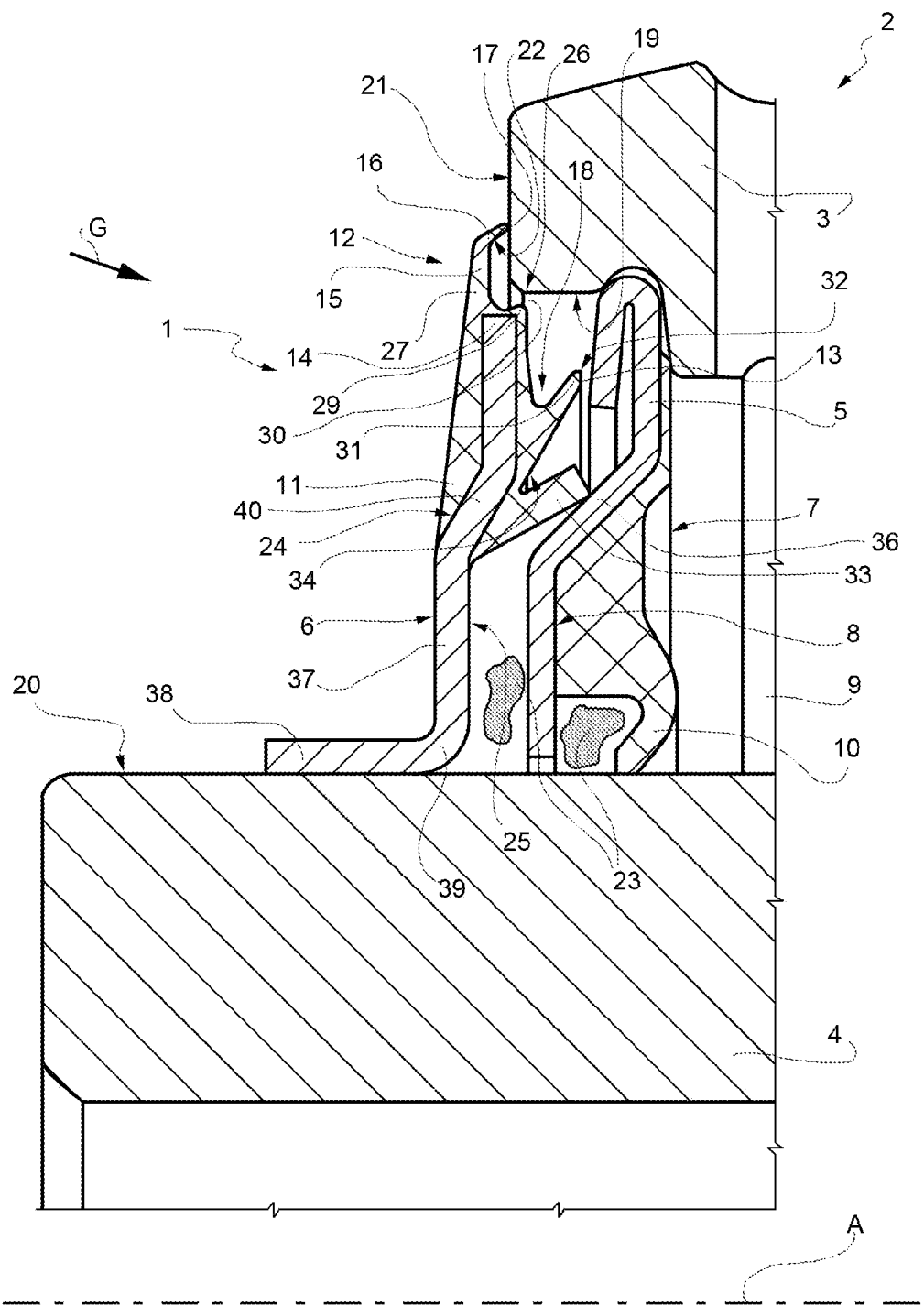
FIG. 1 diagrammatically shows a radial section view of a rolling bearing and of the respective sealing device made according to the invention.

With reference to FIG. 1, reference numeral 1 indicates as a whole a sealing device for a rolling bearing 2; the rolling bearing 2 comprises a first ring 3 (the outer ring 3 in the illustrated example), a second ring 4 (the inner ring 4 in the illustrated example), and the sealing device 1, interposed between the inner ring 4 and the outer ring 3.

The sealing device 1 comprises a first annular shield 5 made of metal sheet, designed to be constrained to the outer ring 3 in use, and a second annular shield 6, also made of metal sheet, arranged facing the first shield 5 and designed to be constrained to the inner ring 4 in use.

The sealing device 1 further comprises a first sealing gasket 7 made of an elastomer and integrally carried by a first face 8 of the first shield 5 facing the side opposite to the second shield 6 and towards an annular inner chamber 9 of the bearing 2 delimited between the rings 3 and 4; the gasket 7 is provided with at least one annular sliding sealing lip 10 (known in itself) intended to cooperate in contact, in use, with the inner ring 4.

The sealing device 1 also comprises a second sealing gasket 11 made of an elastomer and integrally carried by the second shield, 6; the second gasket 11 comprises at least a first annular non contacting sealing lip 12 and a second annular non contacting sealing lip 13 designed to cooperate, in use, the lip 12 with the first ring or outer ring 3 of the rolling bearing 2 and (as will be described below) the lip 13 with the first shield 5, respectively.

According to the invention, the first annular non contacting sealing lip 12 (FIGS. 2 and 3) extends projecting from a radially outer peripheral edge 14 of the second shield 6, which peripheral edge 14 faces the side opposite to the first shield 5; the annular lip 12 is elastically deformable, because it is completely free from a rigid core/armature such as that constituted by the shield 6, and is shaped to be adapted to bend, in use, towards the first shield 5 and, consequently, towards and against the outer ring 3, when the shield 6 and the respective lip 12 are reached by an external bias directed towards the bearing 2, in the case in point when the shield 6 is struck by a jet of liquid G, diagrammatically indicated by the arrow in FIG. 1, e.g. a jet G of pressurized washing liquid containing a surfactant detergent.

The first annular non contacting lip 12 comprises a first elastically deformable portion 15 which extends projecting from the peripheral edge 14, and a second portion 16 defining a peripheral annular edge of the first lip 12 opposite to the peripheral edge 14 of the shield 6; the portion or peripheral annular edge 16 is shaped as a truncated-cone toroid which extends axially and radially projecting from the first portion 15 and which, in the illustrated example, tapers towards its free end 17, which free end 17 is adapted, in use, to remain axially away from the outer ring 3 of the rolling bearing 2 in non-deformed conditions of the portion 15 but to come axially into contact with the ring 3 when the first annular lip 12 is bent towards the shield 5.

The second portion 16 of the first annular non contacting lip 12 is arranged obliquely with respect to a common symmetry axis A of the sealing device 1 and of the rolling bearing 2, with respect to which the annular shields 5, 6, the annular gaskets 7, 11 and the rings 3 and 4 are coaxial. In particular, the portion 16 is arranged obliquely with respect to axis A so as to move away from axis A towards, i.e. in the direction of, its free end 17.

In combination with the features described above, the second annular non contacting lip 13 extends axially projecting from the second shield 6 on the same side as the second portion 16 of the first annular lip 12; furthermore, the axial projection with respect to the shield 6, of the lip 13 is greater than that of the portion 16, so that the lip 13 extends axially beyond the second portion 16 of the first annular lip 12.

The second annular non contacting lip 13 is also arranged obliquely with respect to the symmetry axis A so as to extend radially projecting from the second shield 6 towards, i.e. on the side of, the first annular non contacting lip 12 to form towards the first annular non contacting lip 12, a first annular collecting channel 18 of possible contaminants which pass beyond the first annular lip 12.

In the illustrated example, the first shield 5 is fitted within an annular seat 19 (FIG. 1) of the outer ring 3 and has the annular contacting lip 10 thereof cooperating with a radially outer lateral surface 20 of the inner ring 4; furthermore, the second shield 6 is fitted on the radially outer lateral surface 20 of the inner ring 4 outside the annular seat 19 and towards an environment outside the inner 4 and outer 3 rings, externally to the annular chamber 9 and at the opposite side of the annular chamber 9.

The first annular non contacting lip 12 is substantially arranged entirely radially on the outside of the annular seat 19 in which the first shield 5 is fitted and has the second portion 16 thereof which axially cooperates with a frontal surface 21 of the outer ring 3 perpendicular to the radially outer lateral surface 20 of the inner ring 4. In particular, the free end 17 of the second portion 16 of the first annular non contacting lip 12 is normally (with portion 15 non-deformed) kept slightly axially away from the frontal surface 21 to form an axial labyrinth seal 22 therewith.

Conversely, the free end 17 axially coming into contact with the frontal surface 21 of the outer ring 4 when the first annular (normally) non contacting lip 12 is bent towards the first shield 5, i.e. when under the outer bias of the jet G of liquid the portion 15 elastically bends towards the ring 3.

According to a preferred embodiment of the invention, the second sealing gasket 11 extends on both a first 24 and a second 25 mutually opposite faces, of the second shield 6, entirely incorporating the peripheral edge 14.

In particular, the first portion 15 of the first non contacting lip 12 extends projecting from the side of the first face 24, which faces towards the side opposite to the first shield 5, and the second portion 16 of the first non contacting lip 12 extending axially in front of the peripheral edge 14 and radially away from the peripheral edge 14 by the entire length of the first portion 15; furthermore, the second non contacting lip 13 extends radially and axially projecting from the second face 25 of the second shield 6, which face 25 faces towards the first shield 5.

According to another feature of the invention, the second sealing gasket 11 is provided between the first 12 and the second 13 non contacting lips and at the peripheral edge 14 of the second shield 6 with a sealing portion 26, which covers the peripheral edge 14.

In axial direction, starting from a base or base portion 27 of the first portion 15 of the annular sealing lip 12 (FIG. 5), the sealing portion 26 has an annular groove 28 having a concavity facing towards the second portion 16 of the first annular non-contacting lip 12 and arranged axially at the free end 17 of the second portion 16 of the first annular non-contacting lip 12 and an annular protrusion 29 which extend radially towards the second portion 16 of the first annular non-contacting lip 12 and which flanks the annular groove 28 on the side facing towards the second annular non-contacting lip 13.

In this manner, the annular groove 28 forms/defines a second annular collecting channel of possible contaminants which pass beyond the annular lip 12, arranged immediately upstream of the first channel 18 with reference to the direction of the jet G; the annular protrusion 29 is further arranged axially beyond the free end 17 of the second portion 16 of the first annular non contacting lip 12 so as to serve, in use, as barrier interposed between the first 12 and the second 13 annular non contacting lips and to address possible drops of liquid which pass beyond the free end 17 of the second portion 16 of the first annular lip 12 towards the annular groove 28.

The annular protrusion 29 is further designed to be adapted, in use, to cooperate with the first ring 3 of the rolling bearing 2 to define a radial labyrinth seal 30 therewith (FIG. 1).

According to a further feature of the invention, the second annular non contacting lip 13 is shaped as a truncated-cone toroid, which extends axially and radially projecting from the second shield 6 so as to depart from the symmetry axis A towards/in the direction of a first end 31 thereof (FIGS. 2 and 4) and which tapers towards a free end 31 thereof, which is arranged just axially away from the first shield 5 to define an axial labyrinth seal 32 therewith (FIG. 1).

The second annular gasket 11 preferably also comprises a third annular lip 33 arranged obliquely with respect to the symmetry axis A so as to extend from the second shield 6 radially projecting towards the second annular non contacting lip 12 and axially projecting towards the first shield 5 to form, towards the second annular non contacting lip 12, a third collecting channel 34 of possible contaminants which pass beyond the first annular lip 12.

The third annular lip 33 is shaped as a truncated-cone toroid which extends axially and radially projecting from the second shield 6 so as to go away from the symmetry axis A towards a free end 35 thereof (FIG. 2), which is arranged axially at least in part beyond a free end 31 of the second annular non contacting lip 13.

In particular, the third annular lip 33 extends axially beyond the second annular non contacting lips 13 and towards an oblique portion 36 of the first shield 5 (FIG. 1); the oblique portion 36 is truncated cone shaped; the lip 33 forms with the oblique portion 36 a contacting seal and may be different, according to the circumstances and the available spaces of length, as diagrammatically shown in FIG. 2, wherein the lip 33 is illustrated with a solid line in its smaller configuration length 36, and in part dashed in its greater length configuration, in which the free end 35 protrudes completely overhangingly in axial direction with respect to the free end 31 of the lip 13.

Furthermore, unlikely of the lips 12 and 13, the third annular lip 33 has, in the non-limiting example shown, a constant thickness to its free end 35.

The second shield 6, which with the respective gasket 11 is the core of the invention, is defined by a metallic element having a flange portion 37 with a radial extension and arranged facing the first shield 5 and a fitting portion 38, designed for the forced fixing, in use, of the second shield 6 onto the second (inner) ring 4 of the rolling bearing 2; the flange portion 37 radially projects from the fitting portion 38, extending from the side of an end 39 of the fitting portion 38 facing towards the first shield 5.

The flange portion 37 defines the peripheral edge 14 of the second shield 6 and has a double fold 40 substantially on the center-line, from which double fold the second annular non contacting lip 12 departs; the double fold 40 is arranged axially at a base or base portion 27 of the first portion 15 of the first annular non contacting lip 12, so as to radially support it.

Furthermore, according to a further feature of the invention, lubricant grease 23 is arranged between the second shield 6 and the contacting lip 10 of the first gasket, whereas no lubricant grease is arranged at the first and second annular non contacting lips 12, 13, at the first collecting channel 18 and at the annular groove 28.

This prevents the detergent liquid used for the washing from mixing with the lubricant grease facilitating the passing of the lip 12 and, above all, of the subsequent lips (proceeding in the direction from the outside towards the inside of the chamber 9); furthermore, the simple emptying by gravity of the channel 18 (and of the other channels formed by the groove 28 and by the lip 33) when the jet G is stopped, also by virtue of the fact that the portion 16 moves away again from the ring 3 allowing the passage of liquid from the inside outwards through the labyrinth seal 22 by virtue of the particular conformation of the portion 16, while it prevents, or in all cases obstructs, the introduction of liquid from the outside of the bearing 2 inwards, allowing the rapid exiting by making the portion 16 turn elastically outwards (from the side opposite to the seat 19) so as to "broaden" and substantially make the labyrinth seal 22 temporarily disappearing.

By virtue of the described structure, the sealing device 1 does not have the objective of completely preventing the penetration of detergent liquid beyond the shield 6, but that of limiting the amount of penetrated liquid, and above all to allow its collection in the channels 18, 28 and 34 so as to prevent reaching the sealing lip 10 itself and then cause the rapid evacuation through the space between the ring 3 and the free end 17 of the lip 12.

All the objects of the invention are thus reached.

The invention claimed is:

1. A sealing device for a rolling bearing, the sealing device comprising:
   a first annular shield designed to be constrained to a first ring of the rolling bearing;
   a second annular shield arranged facing the first shield and designed to be constrained to a second ring of the rolling bearing;
   a first sealing gasket made of an elastomer and integrally carried by a first face of the first shield, the first gasket being provided with at least one annular sliding sealing lip sealingly contactable with the second ring of the rolling bearing; and
   a second sealing gasket made of an elastomer and integrally carried by the second shield, the second gasket comprising one first lip and one second lip, the second lip forming an annular non-contacting sealing lip designed to cooperate with the first shield, the first lip being deformable between a first position, in which the first lip forms part of an annular labyrinth seal and does not contact the first ring, and a second position, in which the first lip forms a seal with the first ring due to fluid pressure, wherein, in combination:
   i)—the first face of the first shield faces axially away from the second shield and the first lip extends projecting from a peripheral edge of the second shield facing generally radially away from the second ring so as to be in the first position, the first lip is elastically deformable to bend axially towards the first shield and into the second position when the second shield is struck by a jet of liquid;
   ii)—the first lip comprises a first portion, which extends radially from the peripheral edge of the second shield, and a second portion, separated from the second shield by the first portion, defining a peripheral annular edge of the first lip, the second portion is shaped as a truncated-cone toroid which extends axially and radially from the first portion and which presents a free end designed, to remain axially separate from the first ring of the rolling bearing until the first lip is in the second position and to come axially into contact with the first ring of the rolling bearing when the first lip is bent towards the first shield so as to be in the second position;

iii)—the second portion of the first lip is configured such that when the first lip is in the second position the second portion is positioned obliquely with respect to a symmetry axis of the sealing device so as to extend in a direction away from the symmetry axis;

iv)—the second lip extends radially and axially, the second lip extending axially from the second shield toward the first shield such that the second lip extends axially closer to the first shield than the first lip; and v)—the second lip is arranged obliquely with respect to the symmetry axis so as to extend axially toward the first shield and to extend radially away from the second ring to form a first annular collecting channel for possible contaminants which pass beyond the first annular lip.

2. The sealing device according to claim 1, wherein the second sealing gasket extends on both a first and a second axial face of the second shield, entirely surrounding the peripheral edge of the second shield, the first portion of the first lip also extending from the first axial face of the second shield, which faces axially away from the first shield.

3. The sealing device according to claim 2, wherein the second sealing gasket also extends along the second axial face of the second shield between the first lip and the second lip:

the second sealing gasket forming an annular groove between the first lip and the second lip and along the peripheral end of the second shield, the annular groove having a concavity facing towards the first ring and which forms a second annular collecting channel for possible contaminants which pass beyond the first annular lip;

an annular protrusion which extends radially towards the first ring and which flanks the annular groove on a side axially closest to the second; and the annular protrusion being arranged to serve as a barrier interposed between the first lip and the second lip and to collect possible drops of liquid which pass beyond the free end of the second portion of the first lip towards the annular groove.

4. A sealing device according to claim 3, wherein the annular protrusion is configured to cooperate with the first ring of the rolling bearing to define a radial labyrinth seal therewith.

5. A sealing device according to claim 1, wherein the second lip is shaped as a truncated-cone toroid, which extends axially toward the first shield and radially away from the second ring;

the second portion defining the peripheral annular edge of the first lip is tapered towards the free end thereof.

6. A sealing device according to claim 1, wherein the second annular gasket comprises a third lip arranged obliquely with respect to the symmetry axis so as to extend axially toward the first shield and radially towards the first ring to form a third collecting channel for possible contaminants which pass beyond the first lip.

7. A sealing device according to claim 6, wherein the third lip is shaped as a truncated-cone toroid that is configured to extend axially inward beyond a frontal surface of the first ring to a greater distance than the second lip.

8. A sealing device according to claim 6, wherein the thickness of the third lip is constant.

9. A sealing device according to claim 1, wherein the second shield is defined by a flange portion with a radial extension facing the first shield and a fitting portion, designed for the forced fixing, of the second shield on the second ring of the rolling bearing.

10. A rolling bearing comprising:
an outer ring;
an inner ring; and
a sealing device according to claim 1.

* * * * *